Figure 1:
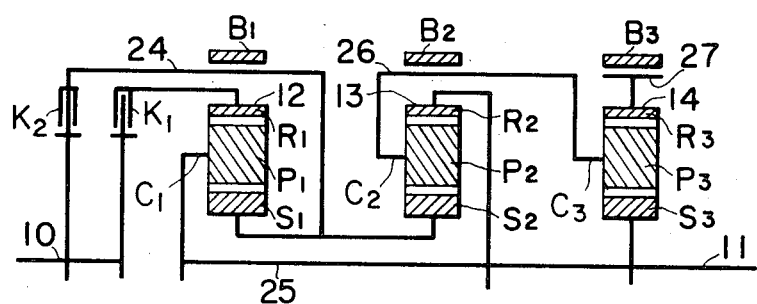

United States Patent

Mori et al.

[15] 3,701,293

[45] Oct. 31, 1972

[54] GEAR TRAIN ARRANGEMENTS

[72] Inventors: Yoichi Mori, Yokohama; Nobuo Okazaki, Chigasaki; Kunio Ohtsuka, Tetsuya Iijima, both of Ohta-ku, Tokyo, all of Japan

[73] Assignee: Nissan Motor Company, Limited, Yokohama, Japan

[22] Filed: April 21, 1970

[21] Appl. No.: 30,496

[52] U.S. Cl...................................74/759, 74/763
[51] Int. Cl................................F16h 57/10
[58] Field of Search..................................74/759, 763

[56] References Cited

UNITED STATES PATENTS

| | | |
|---|---|---|
| 2,856,794 | 10/1958 | Simpson......................74/763 |
| 3,339,431 | 9/1967 | Choswhite et al. ......74/763 X |
| 3,523,468 | 8/1970 | Kepner........................74/759 |

*Primary Examiner*—Arthur I. McKeon
*Attorney*—McCarthy, De Paoli and O'Brien

[57] ABSTRACT

Gear train arrangements for transmitting a power from a driving source to a driven member at more than three speeds in one direction an another speed in the opposite direction, the gear train arrangements using basically three planetary gear sets and at least five friction elements such as clutches and brakes which are selectively actuated to selectively engage the rotary members of the three planetary gear sets to deliver an output power at the above said speeds. The gear train arrangements are specifically adapted for use in an automatic transmission system of a motor vehicle using a torque converter or fluid coupling.

1 Claim, 2 Drawing Figures

3,701,293

INVENTORS
YOICHI MORI
NOBUO OKAZAKI
KUNIO OHTSUKA
TETSUYA IIJIMA

BY
McCarthy, Depaoli & O'Brien
ATTORNEYS

GEAR TRAIN ARRANGEMENTS

This invention relates to gear train arrangements for a transmission system of a motor vehicle and, more particularly, to gear train arrangements of planetary gear type adapted to provide basically four forward and one reverse vehicle speeds.

A usual gear train arrangement using a planetary gear system is made up of a combination of one or more, similar or different, planetary gear sets each having one or more planet pinions and is operated through actuation of friction elements such as clutches and brakes which are arranged to attain a desired combination of gear ratios. Typical of such gear train arrangement is the one that uses one or more simple planetary gear sets which are combined to provide three forward and one reverse vehicle speeds. (It may be noted that the term "simple" planetary gear set as herein used is intended to refer to a planetary gear set having at least one planet pinion.)

Foremost of the practical requirements of a gear train arrangement to attain an increased number of vehicle speeds is a wide selection of the combinations of gear ratios, which requirement, however, is reflected by an increased number of component parts of the gear train arrangement and complicated gear shifting operations.

In order that the gear train be snugly accommodated within a limited space in the transmission system, every component of the planetary gear system should be as small in dimensions as possible. From the view point of production economy, moreover, it is desired that the number of the component parts of the gear train be reduced to a minimum and that the parts corresponding in function be fabricated to be common in geometry to one another so as to permit quantity production. Another important requirement of the gear train of a transmission system is the ease of gear shifting operations.

It is, therefore, an object of the invention to provide gear train arrangements adapted to provide four forward and one reverse vehicle speeds.

Another object is to provide gear train arrangements providing essentially four forward and one reverse vehicle speeds with wide selection of the combinations of gear ratios.

Still another object is to provide gear train arrangements providing four, or even more, forward and one reverse vehicle speeds, which arrangements are constructed with a practically minimum number of component parts and nevertheless can provide practically any desired combination of gear ratios.

Still another object is to provide gear train arrangements that are suited for quantity production.

Still another object is to provide gear train arrangements providing four, or even more, forward and one reverse vehicle speeds with utmost ease of gear shifting operations.

In order to achieve these and other objects, the invention proposes to use various combinations of basically three substantially identically sized planetary gear sets which are operated by means of two or three clutches and two or three brakes. The gear train arrangements using such combinations can be readily modified with incorporation of additional minor arrangements into those providing five or six forward and one reverse vehicle speeds.

Figure 2:
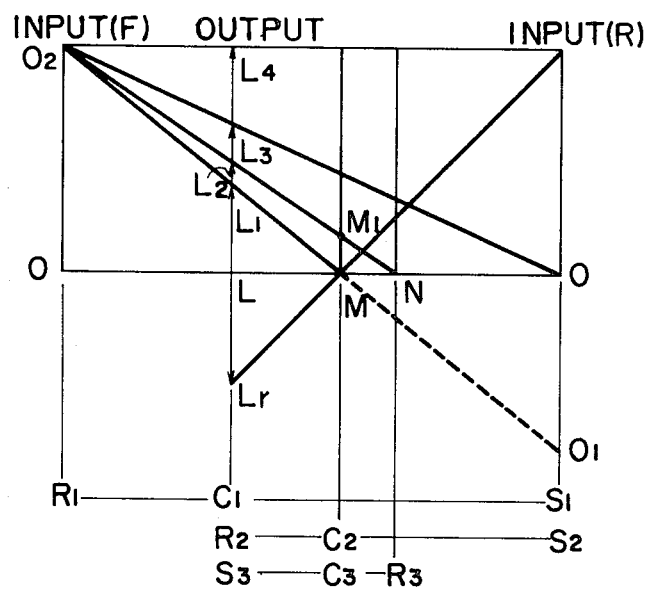

In the drawings:

FIG. 1 is a sectional view schematically showing a preferred embodiment of the present invention; and FIG. 2 is nomographic chart showing the different revolution speeds of the individual rotary members of the planetary gear sets used in the embodiment shown in FIG. 1.

It may be noted in regard to the drawings that only the upper half of each gear train arrangement is herein shown for simplicity of illustration because the gear train arrangement is generally symmetrical with respect to the input and output shafts.

First referring to FIG. 1, the gear train of one embodiment of the present invention is, as customary, comprises an input shaft 10 which may be connected to the turbine of a hydrokinetic torque converter of known construction (not shown). The impeller and the turbine of the torque converter, as is well known, are situated in toroidal fluid flow relationship. The impeller is connected to an engine output shaft of an internal combustion engine.

The gear train includes three planetary gear sets 12, 13, and 14. The planetary gear set 12 includes a ring gear $R_1$, a pinion carrier $C_1$, planet pinions $P_1$ rotatably journaled on the carrier $C_1$ and a sun gear $S_1$. The pinions $P_1$ mesh with the ring gear $R_1$ and the sun gear $S_1$.

The planetary gear set 13 includes a ring gear $R_2$, a pinion carrier $C_2$, planet pinions $P_2$ rotatably journaled on the pinion carrier $C_2$ and a sun gear $S_2$. The pinions $P_2$ mesh with the ring gear $R_2$ and the sun gear $S_2$.

The planetary gear set 14 includes a ring gear $R_3$, a pinion carrier $C_3$, planet pinions $P_3$ rotatably journaled on the pinion carrier $C_3$, and a sun gear $S_3$. The pinions $P_3$ mesh with the pinion carrier $C_3$ and the sun gear $S_3$.

invention. The gear train shown in FIG. 1 is constructed so as to provide four forward and one reverse speeds with use of three planetary gear sets 12, 13 and 14 which are operated by two clutches $K_1$ and $K_2$ and three brakes $B_1$, $B_2$, and $B_3$.

The first clutch $K_1$ is linked on the one hand with the input shaft 10 of the transmission and on the other with the ring gear $R_1$ of the first planetary gear set 12. The second clutch $K_2$, which is also linked with the input shaft 10, is linked with both the sun gears $S_1$ and $S_2$ of the first and second planetary gear sets 12 and 13, respectively, through a drum 24 for the first band brake $B_1$. The sun gears $S_1$ and $S_2$ are as a result constantly connected together and rotatable with each other. The pinion carrier $C_1$ of the first planetary gear set 12 is constantly connected to and rotatable with the ring gear $R_2$ of the second planetary gear set 13, sun gear $S_3$ of the third planetary gear set 14, and output shaft 11 of the transmission through an intermediate shaft 25. The pinion carrier $C_2$ of the second planetary gear set 13 is constantly connected to and rotatable with the pinion carrier $C_3$ of the third planetary gear set 14 through a drum 26 for the second band brake $B_2$. The ring gear $R_3$ of the third planetary gear set 14 is connected to a drum 27 for the third band brake $B_3$.

The conditions of the clutches and the brakes for the different vehicle speeds and the gear ratios attained in these conditions are tabulated in the Table.

TABLE

| | $K_1$ | $K_2$ | $B_1$ | $B_2$ | $B_3$ | Gear ratios | |
|---|---|---|---|---|---|---|---|
| Forward: | | | | | | | |
| 1st | + | − | − | + | − | $1+\alpha_1+\dfrac{\alpha_1}{\alpha_2}$ | (2.45) |
| 2nd | + | − | − | − | + | $1+\alpha_1+\dfrac{\alpha_1(\alpha_2-\alpha_3)}{\alpha_2(1+\alpha_2)}$ | (2.00) |
| 3rd | + | − | + | − | − | $1+\alpha_1$ | (1.45) |
| 4th | + | + | − | − | − | $1$ | (1.00) |
| Rev | − | + | − | + | − | $-\dfrac{1}{\alpha_2}$ | (−2.22) |

When the first speed ratio is selected, the clutch $K_1$ and the brake $B_2$ are engaged. This causes an input torque to be delivered to the ring gear $R_1$ of the planetary gear set 12 and causes the pinion carrier $C_2$ of the planetary gear set 13 to be anchored. Since the pinion carrier $C_1$ is connected to the intermediate shaft 25, the carrier $C_1$ is resisted. This causes the torque delivered to the ring gear $R_1$ to be delivered to the sun gears $S_1$ and $S_2$. Since, in this condition, the carrier $C_2$ is anchored by the brake $B_2$, the torque on the sun gear $S_2$ is delivered to the ring gear $R_2$. The ring gear $R_2$ is connected to the intermediate shaft 25, so that the ring gear $R_2$ is resisted. This causes the sun gear $S_1$ to act as a reaction member in the planetary gear set 12. Thus a split torque delivery path is established in the planetary gear train. Therefore, the input torque will be multiplied by the planetary gear sets 12 and 13 to produce a multiplied output torque on the output shaft 11. The magnitude of the output torque equal to the sum of the torques appeared on the carrier $C_1$ and the ring gear $R_2$.

When the second speed ratio is selected, the brake $B_3$ is engaged while the brake $B_2$ is disengaged with the clutch $K_1$ kept engaged. In this second speed ratio, the same torque delivery path as attained in the first speed ratio is established except that the fact is established in a manner as will be described below. Since the ring gear $R_3$ is anchored by the brake $B_3$ and the sun gear $S_3$ is connected to the output shaft 11, the torque on the output shaft 11 will be multiplied by the planetary gear set 14 and then delivered to the carriers $C_3$ and $C_2$ to cause the same to rotate in the same direction as that of the output shaft 11. Thus the carrier $C_2$ will also act as a reaction member in the planetary gear set 14 in this second speed ratio as in the first speed ratio. Thus it is appreciated that the same torque delivery path as attained in the first speed ratio is established. However, it is to be noted that since some of the torque delivered to the sun gear $S_3$ will be absorbed by the planetary gear set 14 in the second speed ratio, the magnitude of an output torque to be transmitted to the output shaft 11 becomes equal to the remaining torque of the sum of both torques appeared on the carrier $C_1$ and the ring gear $R_2$ subtracted by the torque absorbed by the planetary gear set 14.

When the third speed ratio is selected, the brake $B_1$ is engaged while the brake $B_3$ is disengaged with the clutch $K_1$ kept engaged. This causes the sun gears $S_1$ and $S_2$ to be anchored. Accordingly, the input torque is delivered through the carrier $C_1$ of the planetary gear set 12 to the intermediate shaft 25 through which the same is transmitted to the output shaft 11.

When the fourth speed ratio or direct drive is selected, the clutch $K_2$ is engaged while the brake $B_1$ is disengaged with clutch $K_1$ is kept engaged. This causes the input torque to be delivered to the output shaft 11 in 1:1 ratio.

When the reverse speed ratio is selected, the clutch $K_2$ and the brake $B_2$ are engaged. This causes the input torque to be delivered to the sun gears $S_1$ and $S_2$. Since, in this condition, the carrier $C_2$ is anchored by the brake $B_2$, the torque on the sun gear $S_2$ will be delivered to the ring gear $R_2$, thereby rotating the ring gear $R_2$ in a reverse direction.

When the first forward speed is selected, the clutch $K_1$ is coupled and the brake $B_2$ applied. In this instance, the operations of the individual rotary members will be easily understood if it is assumed that the output shaft 11 is first rotated to impart a rotational effort to the input shaft 10, conversely to the actual operation. Thus, if the output shaft 11 is rotated at a speed corresponding to a vector $LL_1$ in FIG. 2, then the ring gear $R_2$ and the pinion carrier $C_1$ of the planet pinion $P_1$ will rotate at the same speed as the output shaft 11. With the brake $B_2$ applied, the pinion carriers $C_2$ and $C_3$ are held stationary so that the sun gears $S_2$ and $S_1$ rotate at a speed corresponding to a vector $OO_2$. Such rotations of the sun gear $S_1$ and the pinion carrier $C_1$ (which revolves at a speed equal to the revolution speed of the output shaft 11) will dictate the speed at which the ring gear $R_1$ of the first planetary gear set 12 rotates as represented by a vector $O'O_2$ in FIG. 2. The driving force is actually carried to the input shaft 10, not to the output shaft 11, so that the flow of rotation is exactly inverse from that discussed above. Thus, it is apparent that the first speed corresponds with the vector $LL_1$, in FIG. 2.

When the speed is shifted from the first to the second speed, then the brake $B_2$ is released and the brake $B_3$ is applied with the clutch $K_1$ kept coupled. Here, it is also assumed that the driving force is initially transferred to the output shaft 11. If the output shaft 11 is rotated at a speed corresponding to a vector $LL_2$ in FIG. 2, the sun gear $S_3$ rotates with the output shaft 11. The ring gear $R_3$ being held stationary with the brake $B_3$ applied, the pinion carriers $C_2$ and $C_3$ rotate at a speed corresponding to a vector $MM_1$. Since, in this instance, the ring gear $R_2$ rotates with the output shaft 11 at a speed corresponding to the vector $LL_2$, the sun gears $S_2$ and $S_1$ rotate at a speed corresponding to the vector $O'O_1$. The planet pinion $P_1$ is rotated with the pinion carrier $C_1$ rotating with the output shaft 11 so that the ring gear $R_1$ will rotate at a speed corresponding to the vector $OO_2$ in FIG. 2. The actual operations of the planetary gear sets are exactly converse from those discussed above but, anyway, it is apparent that the second speed corresponds to the vector $LL_2$ in FIG. 2.

When the speed is shifted from the second to the third speed, the brake $B_1$ in lieu of the brake $B_3$ is now applied with the clutch $K_1$ kept coupled, so that the sun gears $S_1$ and $S_2$ are held stationary and the ring gear $R_1$ rotates with the input shaft 10. The pinion carrier $C_1$ supporting the planet pinion $P_1$, therefore, rotates at a speeds corresponding to a vector $LL_3$ providing a gear ratio for the third forward speed.

When the speed is further shifted up from the third to the fourth speeds, all the brakes are released and the clutches are coupled so that the first planetary gear set 12 rotates in its entirety at the same speed as the input shaft 10. The speed of the input shaft 10 is in this manner transferred to the output shaft 11 as it is.

For effecting the reverse movement of the vehicle, the clutch $K_2^-$ is coupled and the brake $B_2$ applied. The sun gears $S_2$ now rotates with the input shaft 10 with the pinion carrier held stationary so that the ring gear $R_2$ rotates at a speed corresponding to a vector $LL_r$ which provides a gear ratio to establish the reverse speed.

It will now be appreciated that the gear train of FIG. 2 is, adapted to provide ease of gear shifting operations in any forward drive ratios because the gear ratios can be changed merely by releasing only one of the clutches and brakes and actuating another one of them.

Now, it will be appreciated from the foregoing description to the preferred embodiment of the invention that changes and modifications can be readily made to such embodiments without departing from the spirit and scope of the invention especially in the following respects:

1. The flow of power transmission through the planetary gear sets can be converted with the shaft 11 connected to the torque converter (or fluid coupling) and the shaft 10 to the differential, although the former has been designated as an output shaft and the latter as an input shaft.

2. The brakes to be utilized in the gear trains may be of any type which is presently in use for a power transmission system.

3. The clutches can be relocated suitably inasmuch as the intended rotary member or members are held stationary in a particular gear shifting operation.

4. The planetary gear sets, which have been described as essentially identical in geometry, can be modified to be sized differently from each other so as to provide practically any desired gear combination of gear ratios.

5. The gear trains can be utilized not only for the power transmission system of a motor vehicle but for any other equipment which is intended to transfer from a prime mover a mechanical power at a modified speed.

6. If any one of the planetary gear sets is removed from a gear train of the invention, the gear train will lend itself to a power transmission system of three forward and one reverse speed type.

Features and advantages of the gear train arrangements implementing the invention include:

a. Wide selection of the combinations of gear ratios.

b. Compactness of the overall gear train construction, overcoming the restriction in the accommodation of the gear train in the transmission system.

c. Adaptability to quantity production on a commercial basis because of the identical geometry of the planetary gear sets.

d. Ease of gear shifting operation; any of the forward speeds can be shifted up and down merely by releasing only one of the friction elements and actuating another one of them.

e. Reduced torque capacity required of each clutch.

f. Reduced noise produced when in the gear shifting operation in the transmission system.

What is claimed is:

1. A gear train comprising:
   1. an input shaft;
   2. an intermediate shaft;
   3. an output shaft;
   4. a first planetary gear set having a ring gear, a pinion carrier connected to said output shaft, a plurality of planet pinions rotatably journaled on the pinion carrier and a sun gear on said intermediate shaft meshing with the planet pinions;
   5. a second planetary gear set having a ring gear connected to said output shaft, a pinion carrier, a plurality of planet pinions rotatably journaled on the carrier, the planet pinions meshing with the ring gear, and a sun gear on said intermediate shaft integrally connected to the sun gear of said first planetary gear set, the sun gear of the second planetary gear set meshing with the planet pinions;
   6. a third planetary gear set having a ring gear, a pinion carrier integrally connected to the carrier of said second planetary gear set, a plurality of planet pinions rotatably journaled on the carrier, the planet pinions meshing with the ring gear, and a sun gear integrally connected to said output shaft, the sun gear meshing with the planet pinions;
   7. a first clutch means for connecting said input shaft with the ring gear of said first planetary gear set during operation of first, second, third and fourth forward speed ratios;
   8. a second clutch means for connecting said input shaft with the sun gears of said first and second planetary gear sets during operation of the fourth forward speed ratio and the reverse speed ratio;
   9. a first brake means for anchoring the sun gears of said first and second planetary gear sets during operation of the third forward speed ratio;
   10. a second brake means for anchoring the carriers of said second and third planetary gear sets during operation of the first forward speed and reverse speed ratios; and
   11. a third brake means for anchoring the ring gear of said third planetary gear set during operation of the second forward speed ratio.

* * * * *